No. 640,672. Patented Jan. 2, 1900.
G. W. LEWIS.
GAS ENGINE.
(Application filed Aug. 17, 1894. Renewed Sept. 22, 1898.)
(No Model.) 5 Sheets—Sheet 1.

Witnesses

Inventor
George W. Lewis
by Taylor, Carl N Bowen, Attys.

No. 640,672. Patented Jan. 2, 1900.
G. W. LEWIS.
GAS ENGINE.
(Application filed Aug. 17, 1894. Renewed Sept. 22, 1898.)
(No Model.) 5 Sheets—Sheet 2.
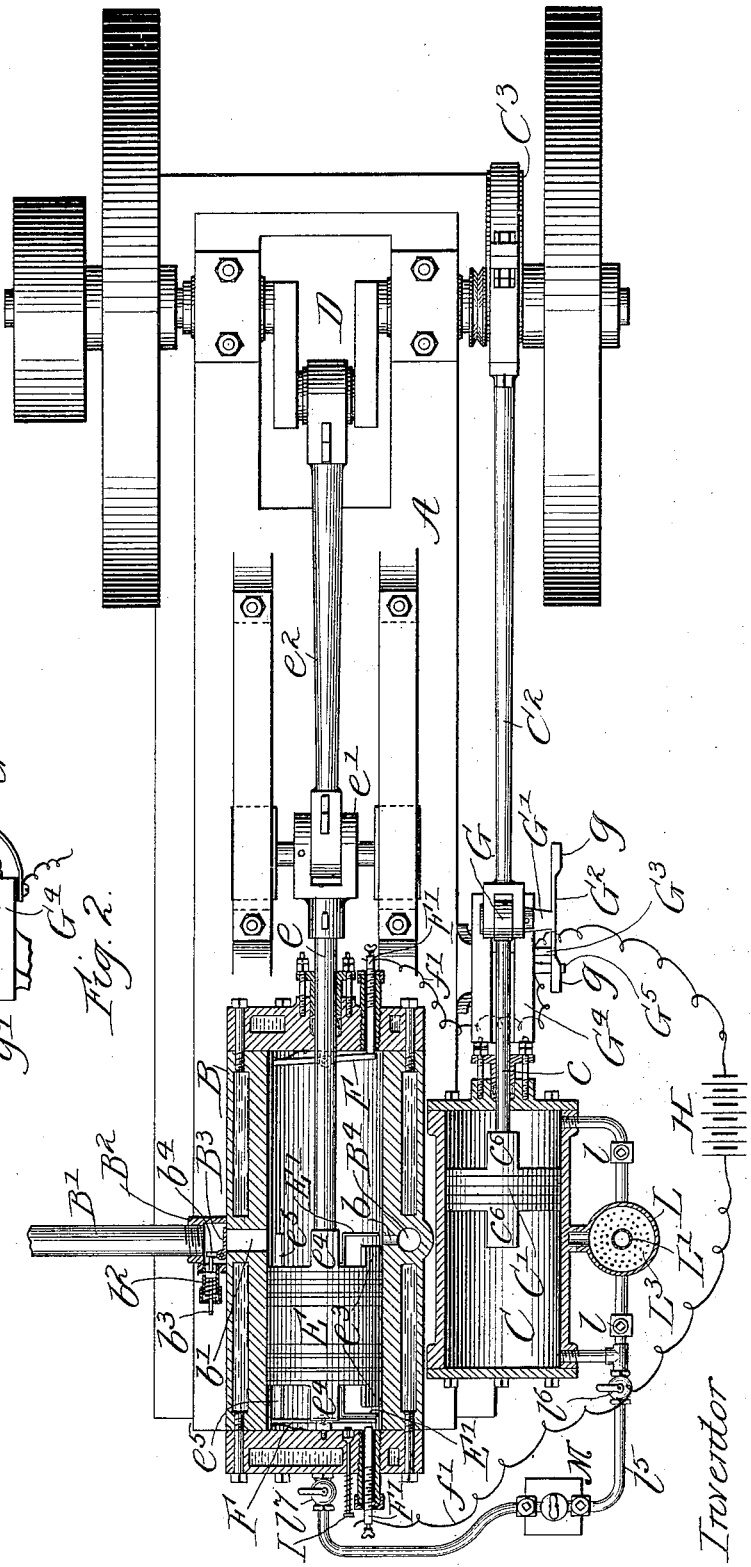

No. 640,672. Patented Jan. 2, 1900.
G. W. LEWIS.
GAS ENGINE.
(Application filed Aug. 17, 1894. Renewed Sept. 22, 1898.)
(No Model.) 5 Sheets—Sheet 3.
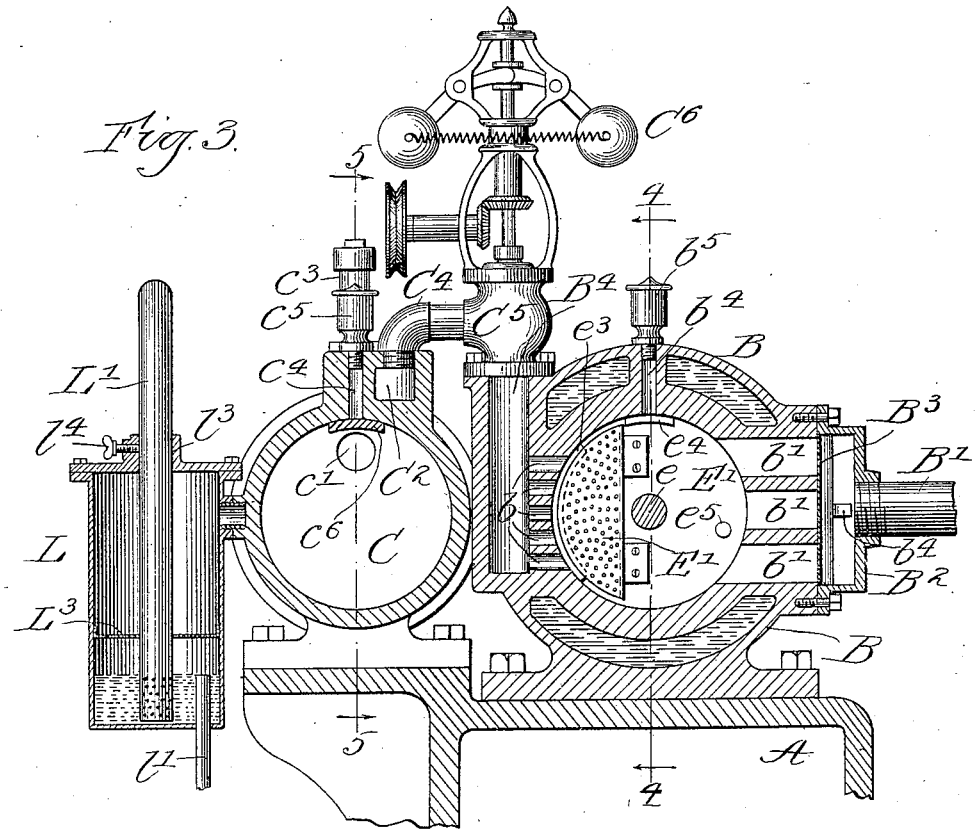
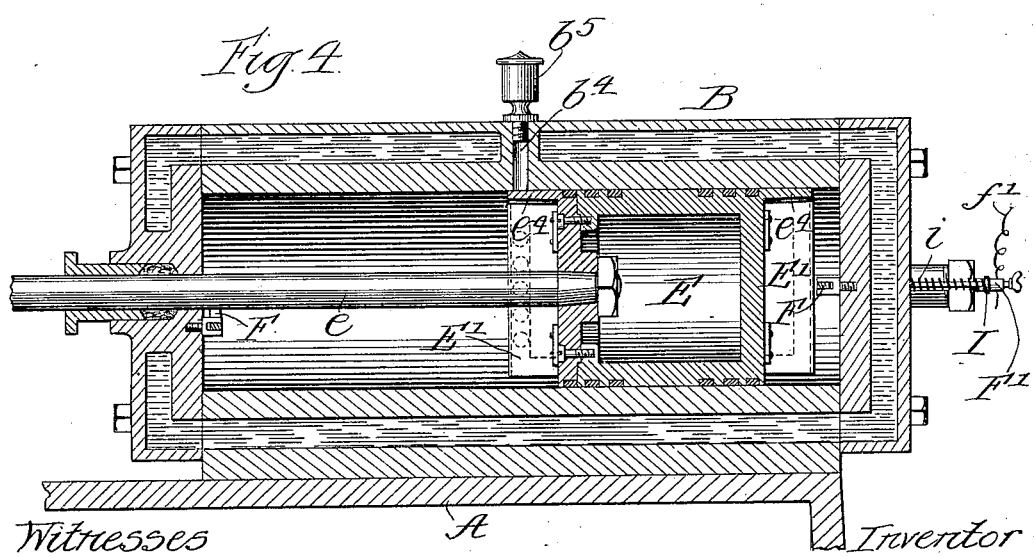
Witnesses
Wm. F. Henning
Clinton Hamlink
Inventor
George W. Lewis
by Dayton, Poole & Brown, Attys.

No. 640,672. Patented Jan. 2, 1900.
G. W. LEWIS.
GAS ENGINE.
(Application filed Aug. 17, 1894. Renewed Sept. 22, 1898.)

(No Model.) 5 Sheets—Sheet 4.

Witnesses
Wm. F. Henning
Clinton Hamlink

Inventor
George W. Lewis
by Dayton, Poole & Brown,
Attys.

THE NORRIS PETERS CO., PHOTO-LITHO., WASHINGTON, D. C.

No. 640,672. Patented Jan. 2, 1900.
G. W. LEWIS.
GAS ENGINE.
(Application filed Aug. 17, 1894. Renewed Sept. 22, 1898.)
(No Model.) 5 Sheets—Sheet 5.
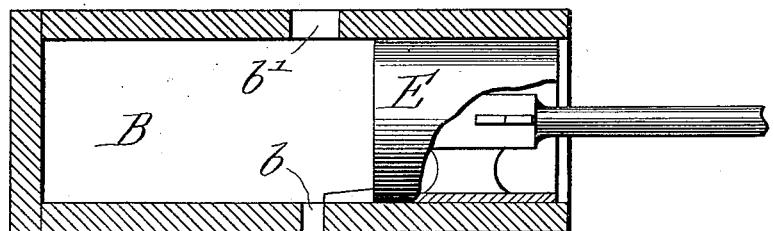
Fig. 10.
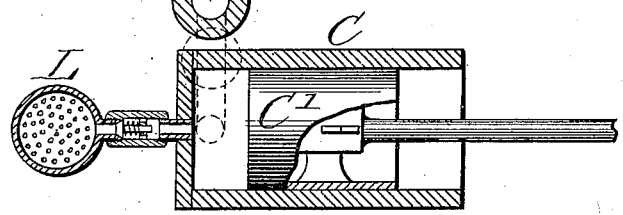
Fig. 11.
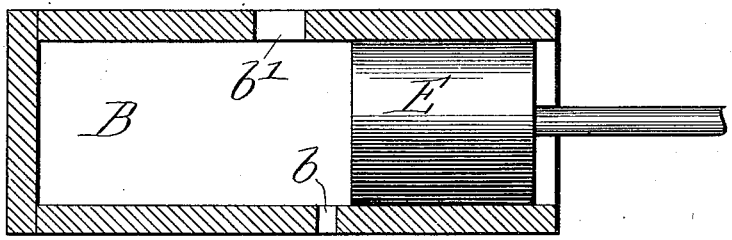
Fig. 12.
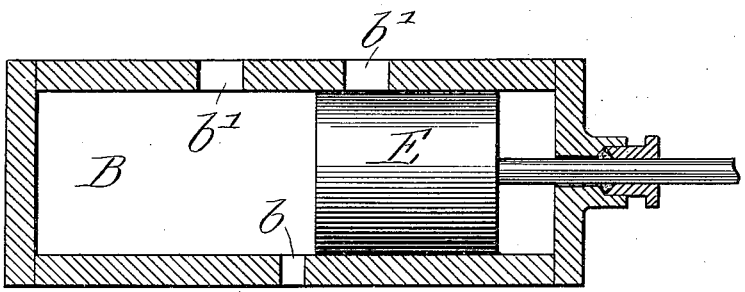
Fig. 13.
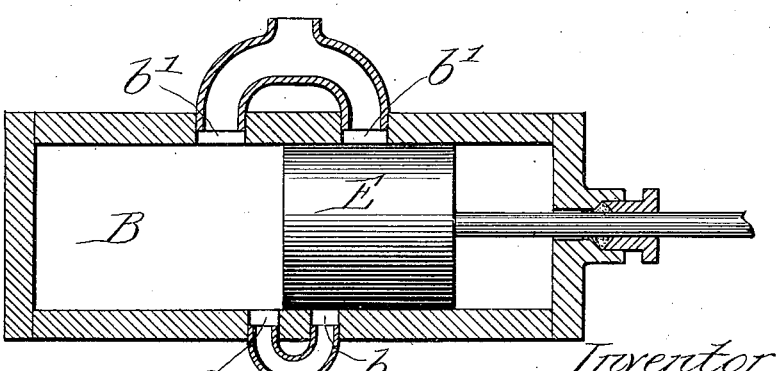
Witnesses
Wm. J. Henning
Clinton Hamlink
Inventor
George W. Lewis.
By Dayton, Poole & Brown, Attys.

United States Patent Office.

GEORGE W. LEWIS, OF CHICAGO, ILLINOIS, ASSIGNOR TO THE J. THOMPSON & SONS MANUFACTURING COMPANY, OF BELOIT, WISCONSIN.

GAS-ENGINE.

SPECIFICATION forming part of Letters Patent No. 640,672, dated January 2, 1900.

Application filed August 17, 1894. Renewed September 22, 1898. Serial No. 691,628. (No model.)

*To all whom it may concern:*

Be it known that I, GEORGE W. LEWIS, of Chicago, in the county of Cook and State of Illinois, have invented certain new and useful Improvements in Gas-Engines; and I do hereby declare that the following is a full, clear, and exact description thereof, reference being had to the accompanying drawings, and to the letters of reference marked thereon, which form a part of this specification.

This invention relates to gas-engines, under which designation are included engines in which hydrocarbon vapor, as well as those in which gas proper, is used as the inflammable ingredient of the explosive mixture.

The invention has for one of its objects to provide a construction free from objectionable complications by which the power-cylinder may be exhausted on the same stroke that is produced by an explosion and recharged before the return stroke, so that an explosion may be made for every stroke of the power-piston.

Another object of the invention is to provide a construction by which the engine may be made double-acting and an explosion produced for each stroke of the piston in each direction of its reciprocatory movement.

Another object of the invention is to provide an improved carbureter which is used when a hydrocarbon vapor is employed as the inflammable ingredient of the explosive mixture.

Figure 1:
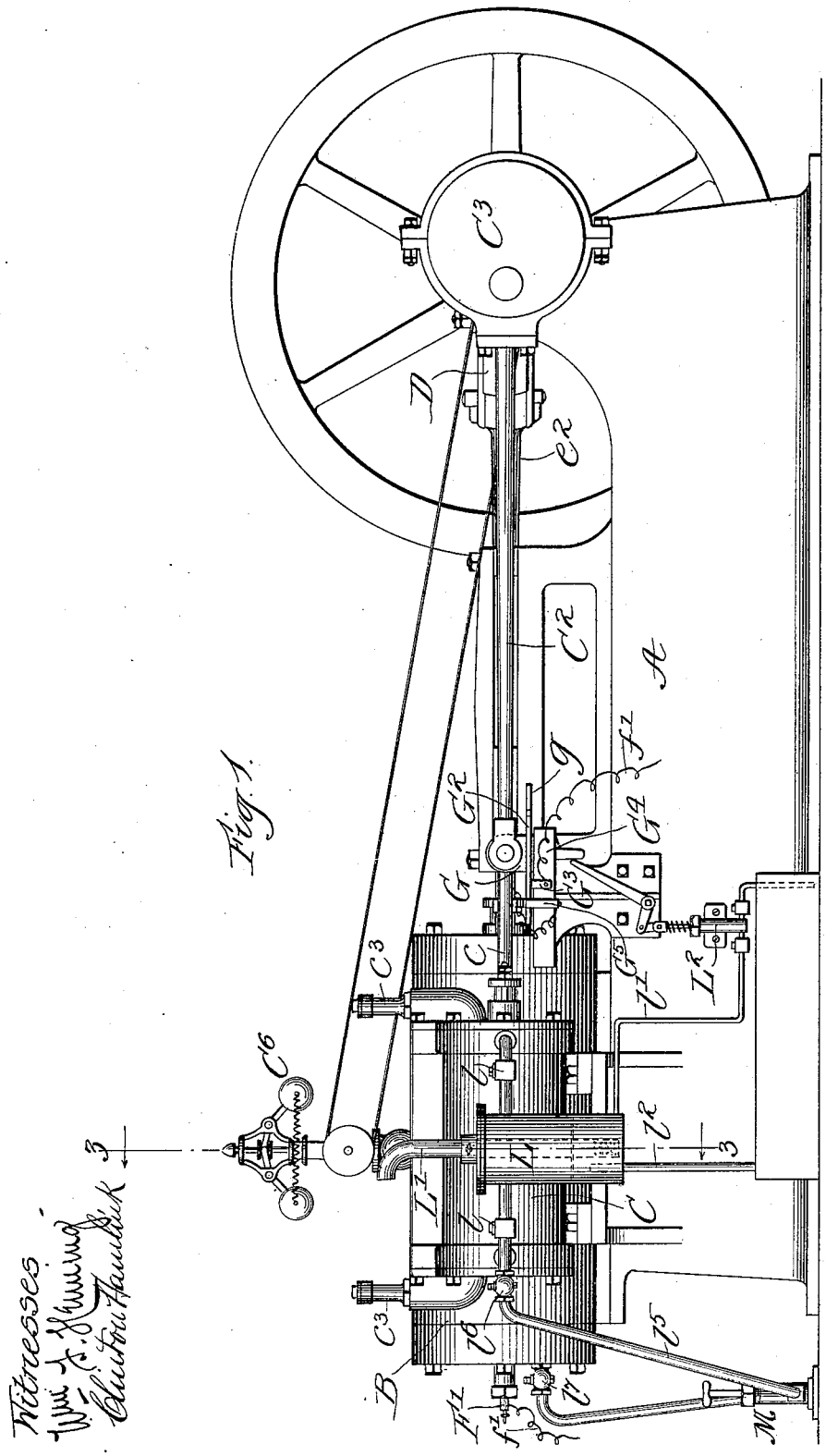
Figure 5:
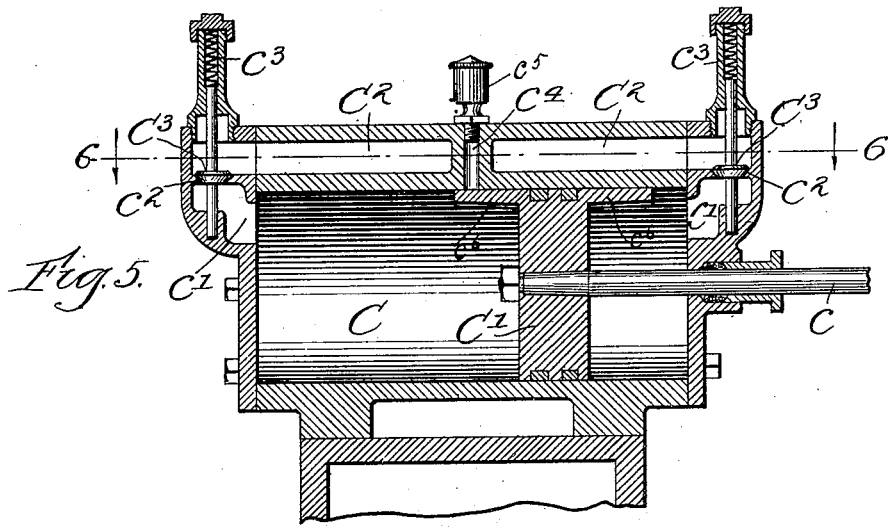
Figure 6:
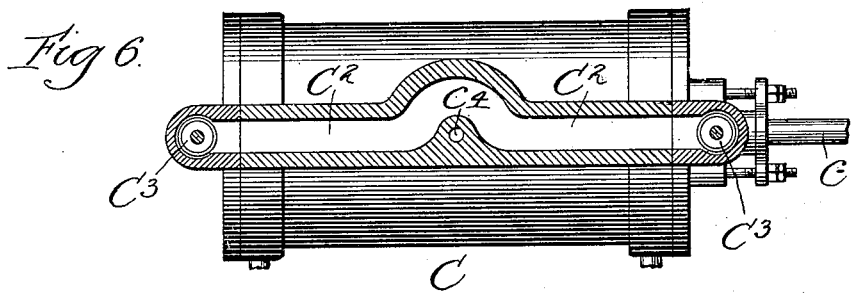
Figure 7:
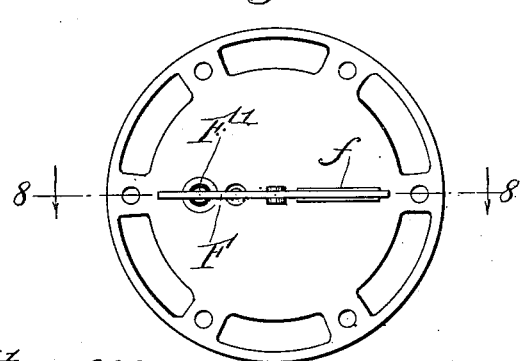
Figure 8:
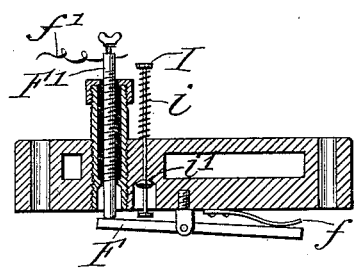

In the accompanying drawings, which illustrate my several improvements in practical forms which are now believed to be preferable to others, Figure 1 is a side elevation of a complete double-acting engine containing all my improvements. Fig. 2 is a plan view, partly in horizontal section, of the engine shown in Fig. 1, the section being taken in the axial plane of the cylinders. Fig. 3 is a vertical transverse section in the line 3 3 of Fig. 1, enlarged. Fig. 4 is a vertical section in the line 4 4 on Fig. 3. Fig. 5 is a vertical section in the line 5 5 of Fig. 3. Fig. 6 is a horizontal section in the line 6 6 of Fig. 5. Fig. 7 is an elevation of one of the power-cylinder heads, presenting the inner face of said cylinder-head to view and showing the vibratory lever of the electric igniting device. Fig. 8 is a horizontal section in the line 8 8 of Fig. 7. Fig. 9 is an end view of the slide belonging to the piston-rod of the charging-cylinder and also a view of the stationary guides for said slide, said figure showing means for opening and closing the electric circuit belonging to the igniting devices. Fig. 10 is a section illustrating the primary elements of the power-cylinder embodied in a single-acting engine. Figs. 11, 12, and 13 illustrate modifications which fall within the invention as claimed herein.

First describing the construction shown in Figs. 1 to 9, inclusive, A represents the frame or bed of a double-acting engine containing my improvements. B is the power-cylinder; C, the charging-cylinder, and D the crank-shaft.

The power-cylinder B is provided at a point midway of its length with a supply-port $b$, preferably having the form of a plurality of passages arranged in a circumferential line of the cylinder, at one side of the latter, as shown in Fig. 3. The power-cylinder B is also provided with an exhaust-port $b'$, preferably arranged opposite to the supply-port and desirably in the form of a plurality of passages, as shown in Figs. 2 and 3.

B' is an exhaust-pipe communicating with the exhaust port or ports $b'$ through the medium in this instance of a chamber $B^2$. The port or passages $b'$ are desirably provided with an outwardly-opening restraining-valve, as $B^3$, which should be held to its seat with a pressure less than that of a fresh charge being introduced into the power-cylinder—as, for example, by a spring $b^2$, Fig. 2, arranged to press a sliding rod $b^3$ against a lug $b^4$, that projects laterally from the hinged valve $B^3$. Both the ports $b$ and $b'$ should be ample in capacity, the latter to allow a prompt reduction of pressure and extinguishment of the flames within the cylinder and discharge of the products of combustion therefrom and the former to permit a prompt and complete recharging of the power-cylinder within the brief time during which the said supply-port is uncovered by the piston. The circumferential extension or arrangement of said ports, as shown, is manifestly favorable to the giving of such desired capacity without objectionable lengthening of the cylinder.

Within the cylinder B is fitted a piston E, which in a double-acting engine is connected to the crank of the shaft D through the familiar media of a piston-rod $e$, cross-head $e'$, and pitman $e^2$. The piston E is of such length as to fairly pass and uncover the supply-port $b$ when at the end of its stroke, the side of the piston adjacent to the exhaust-port $b'$ being in the form now being described shorter than its opposite side, so as to uncover said exhaust-port before uncovering the supply-port. By this means the residual gases produced by an explosion at either end of the power-cylinder are allowed to escape for the most part before a new charge of gas and air is admitted through the supply-port. A desirable mechanical construction of this form of the piston E is indicated in Figs. 2, 3, and 4, taken together, flanges $e^3$ giving the greater length on the side of the supply-ports and similar flanges $e^4$ serving to cover the central oil-supply hole $b^4$, leading from the oil-cup $b^5$.

In order that the new charge of gas and air may not be driven out through the exhaust-port and that, on the other hand, such new charge may further expel the residual gases left in the power-cylinder, a deflector $E'$ is applied to each end of the piston, as indicated in Fig. 4. Preferably said deflector is given the bent form shown in Fig. 2, and its part which is parallel with the end of the piston is perforated, as shown in Fig. 3. Such deflector directs the incoming mixture toward the adjacent end of the cylinder, and thereby pushes the residual gases before it toward and out through the exhaust-port. The perforated part of the deflector additionally produces a diffusion of the incoming mixture, with the effect of better mixing its ingredients with each other and with a portion of the contents of the cylinder to give a mixture of suitable composition for explosion when compressed. The supply-port $b$ being open only when the piston E is at its outstroke, it is necessary that the charging of the power-cylinder be effected by a suitable forcing means, and such a means is shown in the charging-cylinder C and its piston $C'$.

The charging-cylinder C, besides being a suitable inlet for gas or vapor, is constructed with end ports $c'$, one at each end of the cylinder, which communicate by passages $c^2$ with a continuous passage $C^2$, that extends from end to end of the cylinder, the passages $c'$ being closed by upwardly or outwardly opening valves $C^3$, that close automatically by springs $c^3$ or otherwise, as plainly indicated in Fig. 5. The passage $C^2$ communicates with the supply-port $b$ of the power-cylinder through a pipe $C^4$, valve $C^5$, and passage $B^4$, said valve being controlled by a suitable governor—as, for example, shown at $C^6$ in Figs. 1 and 3.

The piston $C'$ within the charging-cylinder is desirably of such thickness as to pass the central circumferential line of the cylinder in which the hole $c^4$, leading from the oil-cup $c^5$, is situated, and to prevent the uncovering of this hole and the consequent sucking of the lubricant into the cylinder the piston is provided with extensions $c^6$, Figs. 2 and 5, arranged in the line of said hole $c^4$ and of suitable length to close said hole when the piston is at either end of its throw. The similar extensions $e^4$ on the power-piston operate similarly to prevent the lubricant from being blown out of the oil-cup $b^5$, which is similarly placed on said power-cylinder.

Next describing the electrical igniting devices by which the explosive mixture is ignited at each end of and inside the power-cylinder, F F are centrally-pivoted levers, one at each end of the cylinder B, each of said levers having a vibratory movement in a horizontal direction and normally standing in the inclined position shown in Figs. 2 and 8 under the force of a spring $f$, arranged behind one of its ends. In this inclined position of either lever F it bears at its retreated end against an insulated electrode $F'$, from which, exterior to the cylinder-head, proceeds an electrical conducting-wire $f'$. A pin $e^5$, projecting from either end of the piston E, is arranged in position to strike the outstanding end of the adjacent lever F, so as to vibrate the latter out of contact with the electrode $F'$, and thus to produce a spark between the said electrode and lever within the cylinder.

An electric current may be maintained through the electrodes $F'$, the levers F, and their metallic connections, to be broken only by the tappets or pins $e^5$ when a spark is to be produced; but for economy I prefer the construction illustrated and next described, in which the circuit is complete and in action only when the piston E is near one or the other end of the cylinder B. In such construction the sliding head G (which connects with the piston-rod $c$ of the piston $C'$ within the charging-cylinder C and also connects with the eccentric-rod $C^2$, leading to the eccentric $C^3$ upon the crank-shaft D) carries an arm $G'$, provided at its outer end with a bar $G^2$, arranged parallel with the piston-rod $c$. Said bar $G'$ is insulated from the slide G and has at its extremities projecting surfaces $g$ $g$.

$G^3$ is a contact-piece having insulated connection with the guide $G^4$ of the slide G or with other suitable support, as indicated in Fig. 9, said contact-piece $G^3$ being continuously in contact with a suitable surface on the reciprocating bar $G^2$.

$G^5$ is a contact-piece also having insulated connection with the guide $G^4$ or with its other support and arranged to bear only upon the protruding surfaces $g$ $g$ of the bar $G^2$ as said bar shall be carried back and forth along the slide G. The contact-pieces $G^3$ and $G^5$ are severally connected with the electrodes $F'$ by the wires $f'$, and a suitable battery or other source of electricity being present, as indicated at H, an electric circuit will be closed through the said electrodes and metallic connections whenever the bar G² is in position to give contact of one of its surfaces g with the contact-piece G⁵. This will occur at the opposite ends of the stroke of the charging-piston C', and the eccentric C³ is so timed with reference to the crank D that this closure of the circuit will commence when the power-piston E is approaching and proximating either end of the power-cylinder. The current being in action, therefore, at each end of the stroke of the power-piston, the pin e⁵ upon said power-piston will vibrate the lever F away from the adjacent electrode and give a spark at the proper time to secure the desired explosion and expansive action of gas behind the said piston.

A lengthwise-movable rod I, extending through the cylinder-head opposite the inwardly-directed end of the lever F, enables a spark to be produced by hand in starting the machine by pushing said rod I inward, said rod being provided with a head or valve i', adapted to close the aperture around the rod, and thereby prevent escape of gases in the regular operation of the engine. Preferably a retracting-spring i is also provided, as shown most clearly in Fig. 8, whereby the valve i' is normally pressed outwardly to its seat.

It will be observed that in the construction shown the spark for igniting the explosive mixture in the power-cylinder is produced and the ignition effected upon the instroke of the power-piston, though very near the completion of such instroke. This is found in practice to be highly advantageous, since the expansive force of the ignited mixture is not instantaneously exerted. It will further be observed that the electrodes F" F' are adjustable as to their protrusion into the power-cylinder, so that the time of sparking with respect to the position of the piston may be varied to any degree of nicety.

The construction of the igniting mechanism above set forth is not herein claimed, but is made the subject of a separate application filed by me on the 21st day of June, 1899, Serial No. 721,378, and which is a division of this application.

L is a carbureter for use when the vapor of a liquid hydrocarbon is employed to furnish the inflammable ingredient of the explosive compound by which the engine is impelled. This carbureter communicates with opposite ends of the charging-cylinder C through the vapor-pipes l l, leading from the upper part of the chamber, and it has a suitable inlet-pipe for liquid—as, for example, shown at l', Fig. 1—through which liquid may be supplied to the carbureting-chamber by a pump L² or other suitable means. An overflow-pipe l² determines the depth of the liquid within the carbureting-chamber. The air-inlet pipe L' is preferably adjustable vertically, as by being adapted to slide in the hole l³ through the top head of the chamber, and to be secured at any desired position by a thumb-screw l⁴. The lower end of the air-pipe L' is preferably open and also laterally perforated, as indicated in Fig. 3, and above the liquid and also above these perforations of the air-pipe, but below the vapor-outlets l l, is placed within the chamber L a perforated diaphragm L³, the object of which is to prevent the liquid from being sucked up into the charging-cylinder in other form than that of vapor by the rapid and violent action of the charging-piston.

A continuation l⁵ of one of the vapor-pipes l, provided with a valve or cock l⁶ and containing a hand-pump M, allows the engine to be charged by hand in starting, said pipe l⁵ being arranged to deliver into one end of the power-cylinder through a valve or cock l⁷, as shown in Figs. 1 and 2.

It is plain that in the construction of the power-cylinder, piston, and igniting devices shown an explosion may take place behind the power-piston at each of its strokes in either direction. The power of the explosion will depend upon the quantity and composition of the mixture in said power-piston, and these will be controlled by the valve C⁵, which in turn is controlled by the governor C⁶, in accordance with the speed of the engine. Therefore the double-acting gas-engine described has the most complete adaptation for automatic control.

Fig. 10 shows certain features of my invention as applied to a single-acting engine, the supply and exhaust ports having the same relation to each other as in the preceding figures. Figs. 11, 12, and 13 show the supply and exhaust ports of the power-cylinder out of exact opposition to each other, the exhaust port or ports b' being less remote than the supply port or ports b from the cylinder head or heads, whereby the piston E, made of equal length throughout, will uncover the exhaust-port before uncovering the supply-port. Fig. 13 additionally shows two supply-ports, as well as two exhaust-ports, one of each for each end of the cylinder. These several modifications are obvious equivalents of the forms shown in the preceding figures first and more fully described, and it is my intention that these and other similar variations shall be regarded as within my invention and claims.

I claim as my invention—

1. In a gas-engine the combination, with a cylinder closed at both ends and provided with supply and exhaust ports each situated between said closed ends, of a power-piston arranged to reciprocate past said ports in both directions, said piston being made longer on its side adjacent to the supply-port than on its side adjacent to the exhaust-port, whereby the latter is first uncovered in each stroke.

2. In a gas-engine, the combination, with a cylinder closed at both ends and provided with supply and exhaust ports each located between said closed ends, of a power-piston arranged to reciprocate past said ports in both directions, said piston being made longer on its side adjacent to the supply-port than on its side adjacent to the exhaust-port, whereby the latter is first uncovered in each stroke, and a secondary charging-cylinder provided with a piston and communicating with the supply-port of the power-cylinder.

3. In a gas-engine the combination, with a power-cylinder closed at both ends and provided with supply and exhaust ports each situated between said closed ends, of a power-piston arranged to reciprocate past said ports in both directions, said piston being made longer on its side adjacent to the supply-port than on its side adjacent to the exhaust-port, whereby the latter is first uncovered in each stroke, a secondary charging-cylinder closed at both ends and discharging directly into the power-cylinder, and a double-acting piston in said charging-cylinder.

4. A gas-engine having a power-cylinder provided with a piston and a lateral supply-port situated at such distance from the cylinder-head as to be uncovered by the piston when nearing the end of its outstroke from said head, and also provided with a lateral exhaust-port which is uncovered by the piston before the uncovering of the supply-port, in combination with a secondary charging-cylinder provided with a piston and discharging directly into the power-cylinder, and a restraining-valve applied to the exhaust-port.

5. In a gas-engine the combination with a double-acting power-cylinder closed at both ends and provided with central supply and exhaust ports, of a piston within the cylinder operating to uncover the supply-port to admit a charge to either end of the cylinder, when nearing the opposite end thereof, and to uncover the exhaust before uncovering the supply port in the same stroke of the piston, and a secondary charging-cylinder provided with a piston and discharging directly into the power-cylinder, substantially as described.

6. A gas-engine provided with a double-headed power-cylinder, containing a piston and provided with a central port arranged to be uncovered by the piston to admit a charge to either end of the cylinder when the piston is nearing the opposite end thereof, and also provided with an exhaust-port which is opened before the uncovering of the supply-port and during the same stroke of the piston, in combination with suitable means for forcibly charging the cylinder through the supply-port, and suitable means at each end of the cylinder for igniting the contents of that end of the cylinder, whereby the engine becomes double-acting and an explosion may be effected behind the piston for each of its strokes in each direction of its movement.

In testimony that I claim the foregoing as my invention I affix my signature in presence of two witnesses.

GEORGE W. LEWIS.

Witnesses:
M. E. DAYTON,
ALBERT H. GRAVES.